(12) United States Patent
Kessler et al.

(10) Patent No.: US 12,180,689 B2
(45) Date of Patent: Dec. 31, 2024

(54) WATER SUPPLY SYSTEM FOR AN AIRCRAFT, AND AIRCRAFT WITH THE WATER SUPPLY SYSTEM

(71) Applicant: Diehl Aviation Gilching GmbH, Gilching (DE)

(72) Inventors: Rolf Kessler, Landsberg (DE); Philipp Schäfer, Munich (DE); Jan Boris Philipp, Munich (DE)

(73) Assignee: Diehl Aviation Gilching GmbH, Gilching (DE)

( * ) Notice: Subject to any disclaimer, the term of this patent is extended or adjusted under 35 U.S.C. 154(b) by 77 days.

(21) Appl. No.: 17/973,608

(22) Filed: Oct. 26, 2022

(65) Prior Publication Data

US 2023/0135331 A1 May 4, 2023

(30) Foreign Application Priority Data

Oct. 28, 2021 (DE) ...................... 10 2021 128 133.4

(51) Int. Cl.
*E03B 1/00* (2006.01)
*B64D 11/02* (2006.01)
*B64D 11/04* (2006.01)

(52) U.S. Cl.
CPC ................ *E03B 1/00* (2013.01); *B64D 11/02* (2013.01); *B64D 11/04* (2013.01)

(58) Field of Classification Search
None
See application file for complete search history.

(56) References Cited

U.S. PATENT DOCUMENTS 9,475,582 B2 * 10/2016 Mackulin ............... B64D 11/02
9,577,433 B2 * 2/2017 Schroeter ................. H02J 4/00
9,869,079 B2    1/2018 Boodaghians et al.
2018/0291595 A1 10/2018 Lübbert et al.

FOREIGN PATENT DOCUMENTS

DE   112015002783 T5   3/2017
EP        3385163 A1   10/2018

* cited by examiner

*Primary Examiner* — Matthew W Jellett
(74) *Attorney, Agent, or Firm* — Laurence A. Greenberg; Werner H. Stemer; Ralph E. Locher

(57) ABSTRACT

A water supply system for an aircraft has water lines which lead to a consumer group with at least one water consumer and at least one buffer upstream of the at least one water consumer. A discharge line discharges water from a water tank into the water lines and a feed pump in the discharge line supplies water from the water tank into the water lines. Each of the water lines is a flexible hose made of plastic with an internal diameter of at least 4 mm and a length of at most 100 m, and the feed pump is configured to convey water from the water tank into the water lines at a pressure of at most 25 bar and a flow rate of at most 1.4 liters per minute.

9 Claims, 4 Drawing Sheets

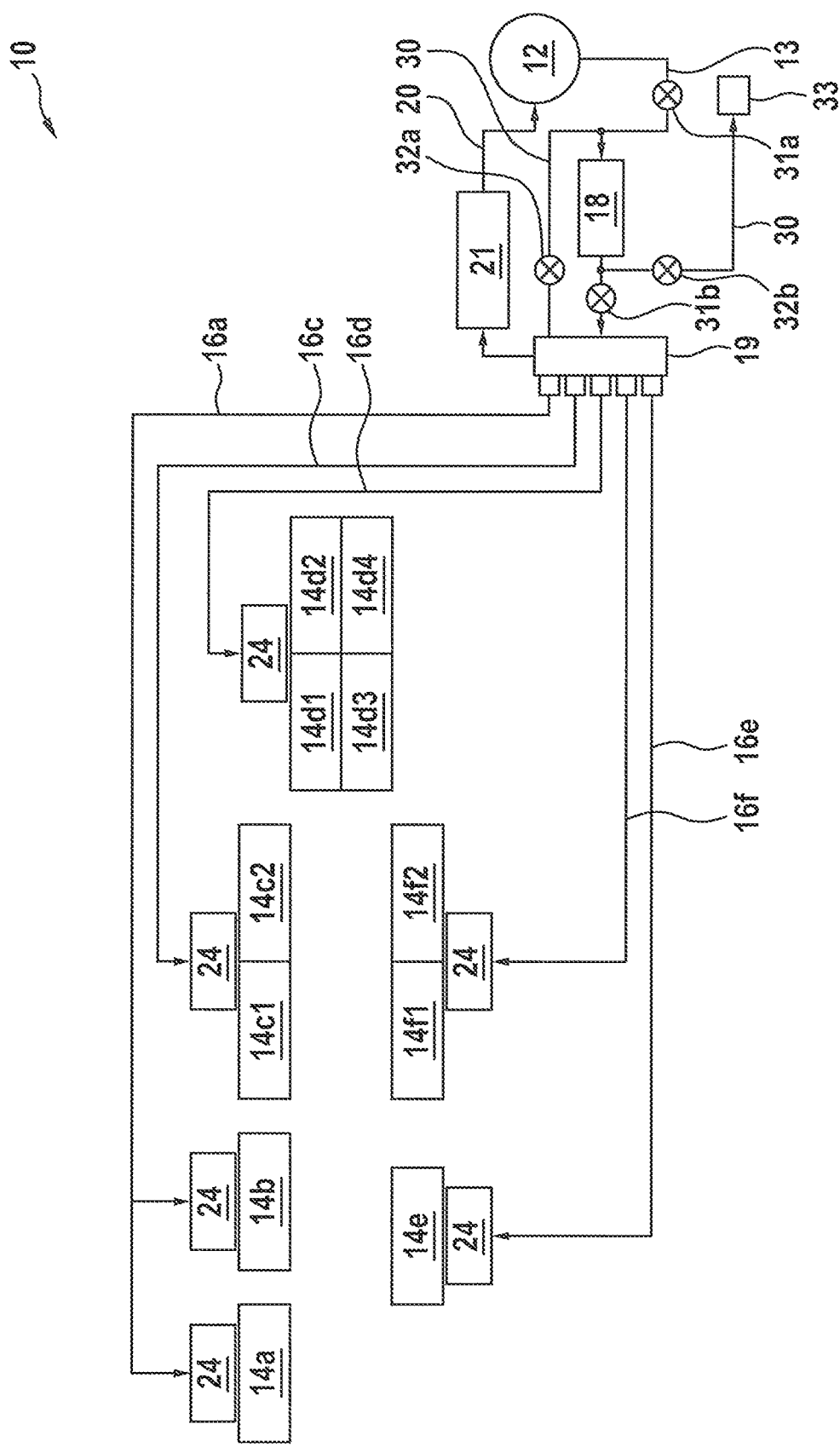

WATER SUPPLY SYSTEM FOR AN AIRCRAFT, AND AIRCRAFT WITH THE WATER SUPPLY SYSTEM

CROSS-REFERENCE TO RELATED APPLICATION

This application claims the priority, under 35 U.S.C. § 119, of German Patent Application DE 10 2021 128 133.4, filed Oct. 28, 2021; the prior application is herewith incorporated by reference in its entirety.

FIELD AND BACKGROUND OF THE INVENTION

The present invention relates to a water supply system for an aircraft, in which water consumers are supplied with fresh water for operation.

Aircraft, in particular passenger aircraft, are normally provided with water supply systems that conduct fresh water from a water tank to the various water consumers, in particular lavatories (toilet flushing and washbasins) and galleys (kitchen sinks). Traditional water supply systems contain pipelines with large pipe cross sections which only exhibit a small pressure drop over their length but still require drainage to protect against freezing. Integrating these in the aircraft is very time-consuming and complex. A different water supply system design in which very narrow water lines made of flexible plastic tubes with an internal diameter of preferably only 3 mm, or less, are used to allow flexible installation, additional pressurizing media for generating a high water pressure of preferably 150 bar to offset the sharp pressure drop in the narrow, flexible water lines and, where necessary, pressure reducers are used upstream of the water consumers, is disclosed in U.S. Pat. No. 10,822,774 B2 and its counterpart European published patent application EP 3 385 163 A1, for example.

SUMMARY OF THE INVENTION

It is accordingly an object of the invention to provide a water supply system which overcomes a variety of disadvantages associated with the heretofore-known devices and methods of this general type and which provides for an improved water supply system for aircraft which can easily be integrated in the aircraft but which means that additional high-pressure systems can be dispensed with.

With the above and other objects in view there is provided, in accordance with the invention, a water supply system for an aircraft, the water supply system comprising:
 a water tank;
 one or more water lines, each of said water lines leading to a consumer group with at least one water consumer and, in a water flow direction upstream of said at least one water consumer, at least one buffer for receiving water from the respective said water line;
 a discharge line for discharging water from said water tank into said one or more water lines;
 said one or more water lines each being a flexible hose made of plastic, having an internal diameter of at least 4 mm and having a length of at most 100 m; and
 a feed pump connected in said discharge line for supplying water from said water tank into said one or more water lines, said feed pump being configured to convey water from said water tank into said one or more water lines at a pressure of at most 25 bar and at a flow rate of at most 1.4 liters per minute.

In other words, the novel water supply system for an aircraft according to the invention has a water tank; one or more water lines, each of which leads to a consumer group which has at least one water consumer and, in the water flow direction upstream of the at least one water consumer, at least one buffer for receiving water from the respective water line; a discharge line for discharging water from the water tank into the one or more water lines; and a feed pump in the discharge line for supplying water from the water tank into one or more water lines. According to the invention, it is proposed that the one or more water lines should each be configured as a flexible hose made of plastic with an internal diameter of roughly 4 mm, at least, and a length of roughly 100 m, at most, and the feed pump is configured in such a manner that it conveys water from the water tank into the one or more water lines at a pressure of roughly 25 bar (2500 kPa), at most, and a flow rate of roughly 1.4 liters per minute (l/min), at most. In particular, the pressure at which the feed pump conveys water from the tank is 3 bar to 25 bar or 3 bar to 16 bar or 3 bar to 10 bar, preferably 4 bar to 16 bar or 6 bar to 25 bar, in particular roughly 16 bar or roughly 25 bar.

The use of narrow, flexible plastic hoses as water lines has the advantage that they can easily be integrated into the aircraft and are relatively insensitive to tolerances and do not require drainage in order to protect against freezing, since they are able to freeze and thaw again quickly and their smooth inner surfaces mean that they do not cause any additional flow resistance. And the special configuration of the dimensions of the water lines and the flow-conveying action of the feed pump means that a relatively low pressure drop can be achieved along the water lines, so that, unlike the system described in U.S. Pat. No. 10,822,774 B2 and EP 3 385 163 A1 no additional complex high-pressure system is required. As a result, the proposed water supply system can be built and integrated into an aircraft even more easily.

The water supply system may have an operating pressure of roughly 16 bar in the case of water lines with an internal diameter of approximately 5 mm, for example, or in the case of water lines with an internal diameter of approximately 4 mm, an operating pressure of roughly 25 bar. With water line lengths of approximately 70 m or approximately 100 m, for example, and with flow rates of roughly 0.7 l/min or roughly 1.4 l/min, for example, the pressure loss is then roughly 10 to 11 bar, at most, with an operating pressure of roughly 16 bar, and roughly 19 to 20 bar, at most, with an operating pressure of roughly 25 bar, according to corresponding simulations. The pressure at the end of the water line to the buffer is therefore definitely slightly more than the customary requirement of the water consumers of roughly 3 bar, meaning that additional pressurizing media designed to increase pressure can be dispensed with.

The one or more water lines preferably each lead to a maximum of four lavatories representing water consumers. This should be taken to mean that one water line should lead to a maximum total of four lavatories in one or more consumer groups and that one water line should lead at most to consumer groups in which the total water consumption corresponds to the water consumption of four lavatories. This limiting of the water consumption from a water line means that the volume flow can be kept low enough for the pressure drop to be kept small.

Depending on the configuration of the water consumers, the consumer group may optionally have, in addition, at least one pressure reducer between the at least one water consumer and the buffer. The relatively low pressure of at most 16 or 25 bar through the feed pump means that in some applications, for example in water consumers which are designed for 16 bar or 25 bar, for example, pressure reducers of this kind can be dispensed with.

In one embodiment of the invention, the buffer upstream of the consumer group may be designed in such a manner that it has an air pressure of at least 3 bar in the empty state. Moreover, if there is a pressure reducer between the buffer and the at least one water consumer, the buffer should have an air pressure of at least 4 bar in the empty state, as the pressure reducer generates a pressure loss of roughly 1 bar. In this way, operational reliability is further improved by the water pressure in the buffer upstream of the consumer group being at least roughly 3 or 4 bar, so that the water consumers can be supplied at at least 3 bar. Buffer feed-in pressures of this kind may each be generated on the side opposite the connection of the water line by air behind a diaphragm in the buffer, for example, or by means of a spring behind a piston in the buffer.

In one embodiment of the invention, a recirculating line may be provided, in addition, which leads from the downstream side of the feed pump back into the water tank and contains an excess pressure valve. The excess pressure valve is open at a pressure of more than 25 bar on the downstream side of the feed pump, so that some water flows back into the water tank rather than into the at least one water line. This measure means that the intended operating pressure in the water lines can be more reliably secured. In the case of the variant of the operating pressure of 16 bar described above, the excess pressure valve is configured in such a manner that it is open at a pressure of more than roughly 16 bar. The excess pressure valve is a passive valve, for example (i.e., closed in principle and opening automatically).

In many applications, the water supply system may contain multiple water lines which each lead to a consumer group with at least one water consumer. In this case, the discharge line from the water tank is connected to the multiple water lines, preferably via a header. The feed pump is arranged in the discharge line and is therefore provided upstream of this header.

In one embodiment of the invention, at least one of the one or more water lines can lead to at least two consumer groups, each having at least one water consumer, and a buffer, wherein the buffers connected to the joint water line can then offset one another.

If a consumer group of the water supply system has a greater water requirement and/or the water line to a consumer group is longer than desired, a booster pump of the feed pump is preferably arranged downstream of this consumer group in the associated water line.

In one embodiment of the invention, the at least one water line may be capable of being vented. The venting may be performed, for example, by a venting valve on the buffer or by a water consumer (e.g., open water cock on a lavatory). In this case, the at least one water line is connected, in addition, to at least one drainage line which preferably leads via the feed pump in the discharge line to a drainage water outlet. In a preferred embodiment of the invention, water supply valves are provided in addition upstream and downstream of the feed pump and drainage valves are provided in the drainage line from the at least one water line upstream and downstream of the feed pump, so that the feed pump can selectively allow water to be conveyed from the water tank into the at least one water line or from the at least one water line to a drainage water outlet.

With the above and other objects in view there is also provided, in accordance with the invention, an aircraft which has at least one inventive water supply system as explained above.

Other features which are considered as characteristic for the invention are set forth in the appended claims.

Although the invention is illustrated and described herein as embodied in a water supply system for an aircraft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 4 is a similar diagram of a fourth exemplary embodiment of a water supply system according to the invention.

DETAILED DESCRIPTION OF THE INVENTION

Figure 1:
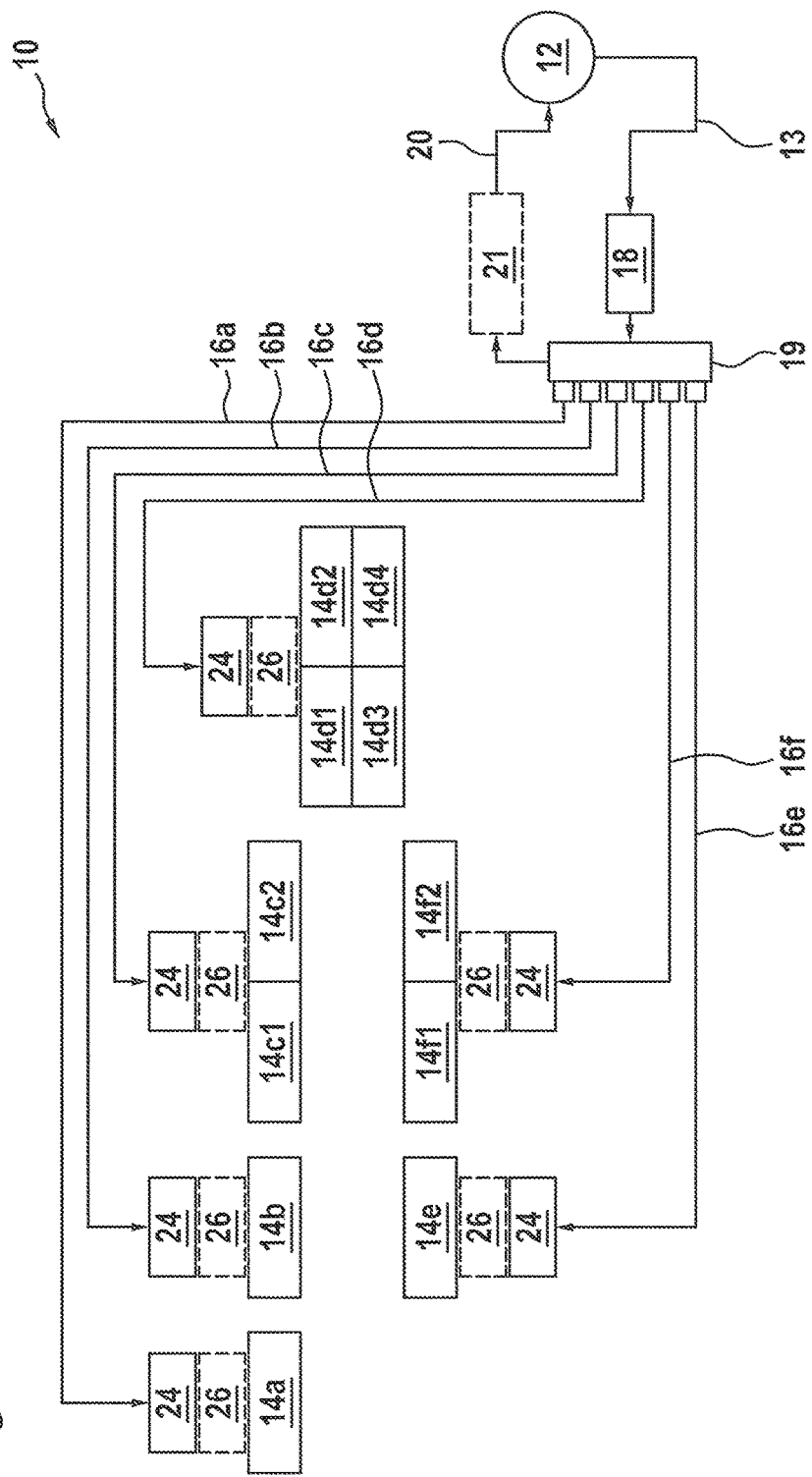
FIG. 1 is a diagram of a first exemplary embodiment of a water supply system according to the invention.

FIG. 1 illustrates a first exemplary embodiment of a water supply system for an aircraft.

The water supply system 10 has a water tank 12 for the storage of fresh water, from which water can be discharged via a discharge line 13. The water from the water tank 12 is fed via multiple water lines 16$a$ . . . 16$f$ (in short, 16$n$) to multiple consumer groups which each have at least one water consumer 14$a$ . . . 14$f$ (in short, 14$n$), i.e., a large number of water consumers 14$n$ (in particular lavatories and/or galleys). The water is conveyed by means of a feed pump 18 through the discharge line 13 from the water tank 12 into the water lines 16$n$, wherein between the discharge line 13 and the multiple water lines 16$n$ is arranged a corresponding header 19.

In this exemplary embodiment, the water is conducted by way of example via a water line 16$a$ to a consumer group with one water consumer 14$a$, via another water line 16$b$ to a another consumer group with one water consumer 14$b$, via another water line 16$c$ to another consumer group with two water consumers 14$c$1 and 14$c$2, via another water line 16$d$ to another consumer group with four water consumers 14$d$1-4, via another water line 16$e$ to another consumer group with a water consumer 14$e$, and via another water line 16$f$ to another consumer group with two water consumers 14$f$1 and 14$f$2.

The water supply system may, of course, also be designed for fewer or more consumer groups (with a corresponding number of water lines 16$n$) and for consumer groups with different numbers of water consumers. As indicated in FIG. 1, each of the water lines 16$n$ leads to a maximum of four lavatories representing water consumers.

As shown in FIG. 1, each consumer group also includes a buffer 24 for receiving and/or temporarily storing the water from the respective water line 16$n$, wherein the buffer 24 is arranged upstream of the at least one water consumer 14$n$ in the water flow direction in each case. Alternatively, consumer groups which have multiple water consumers may also contain more than one buffer, for example one buffer per water consumer. However, the multiple buffers of a consumer group would then also be connected to a joint water line.

Moreover, FIG. 1 shows that depending on the application, the consumer groups may each optionally contain a pressure reducer 26 between the buffer 24 and the at least one water consumer 14n. Unlike other traditional water supply systems, the pressure reducers 26 in the water supply system 10 according to the invention, in the water flow direction from the water lines 16n, are not arranged upstream, but downstream, of the respective buffer 24, i.e., the buffers 24 are arranged on the pressure side upstream of the pressure reducer 26. The pressure reducers 26 are not necessary in the water supply system 10 according to the invention and may be omitted, particularly in the case of the lower operating pressure of roughly 16 bar.

The water lines 16n are each a flexible tube made of plastic with an internal diameter of 4 mm or 5 mm and a length of roughly 100 m or only 70 m, at most, so that they do not require drainage in order to protect against freezing and can be integrated into an aircraft very flexibly and easily. Moreover, the flexible plastic tubes have smooth inner surfaces, in principle, as a result of which no additional pressure losses occur. The feed pump 18 is configured in such a manner that the water is conveyed from the water tank 12 at a maximum pressure of 25 bar and a maximum flow rate of 1.4 l/min (e.g., approx. 0.7 l/min or approx. 1.4 l/min) into each of the water lines 16n. If the internal diameter of the water lines 16n is roughly 4 mm, the operating pressure is preferably roughly 25 bar, and if the internal diameter of the water lines is 16n is roughly 5 mm, the operating pressure is preferably roughly 16 bar. The output of the feed pump 18 is, of course, adapted to the number of attached water lines 16n. As a result of the relatively low pressure loss, as described above, the pressure at the end of the water lines to the buffer 24 is more than 3 bar in each case, i.e., slightly more than the customary requirement of the water consumers 14n in aircraft.

In order to safeguard the necessary minimum pressure for the water consumers 14n even more effectively, the buffers 24 of the consumer groups may each be configured in such a manner that they have an air pressure of at least 3 bar in the empty state. If a pressure reducer 26 is arranged between the buffer 24 and the water consumers 14n of the consumer group, said buffer 24 has an air pressure of at least 4 bar in the empty state, so that the pressure loss of roughly 1 bar generated by the pressure reducer 26 can also be The feed-in pressure of a buffer 24 may be generated, for example, by air behind a membrane in the buffer or a spring behind a piston in the buffer, each of which are positioned on the side opposite the connection of the water line 16n. Depending on the operating pressure through the feed pump and the lengths and the integration paths of the water lines 16n, the buffers 24 store the water from the water lines 16n at a pressure in the range of 4-16 bar or 4-25 bar.

As shown in FIG. 1, the water supply system 10 also has a recirculating line 20 between the header 19, i.e., downstream of the feed pump 18, and the water tank 12. The recirculating line 20 also contains an excess pressure valve 21 which is a passive valve, for example, which is closed in principle and opens automatically when a threshold pressure value is exceeded. The excess pressure valve 21 is designed in such a manner that the pressure threshold value is 16 bar or 25 bar, for example, depending on the configuration of the water lines 16n and the feed pump 18. In this way, the intended operating pressure of 16 bar or 25 bar in the water lines 16n can be guaranteed even more reliably, because when the operating pressure is too high, some water is conducted out of the water lines 16 through the recirculating line 20 into the water tank 12 and the operating pressure in the water lines 16n is lowered accordingly.

Figure 2:
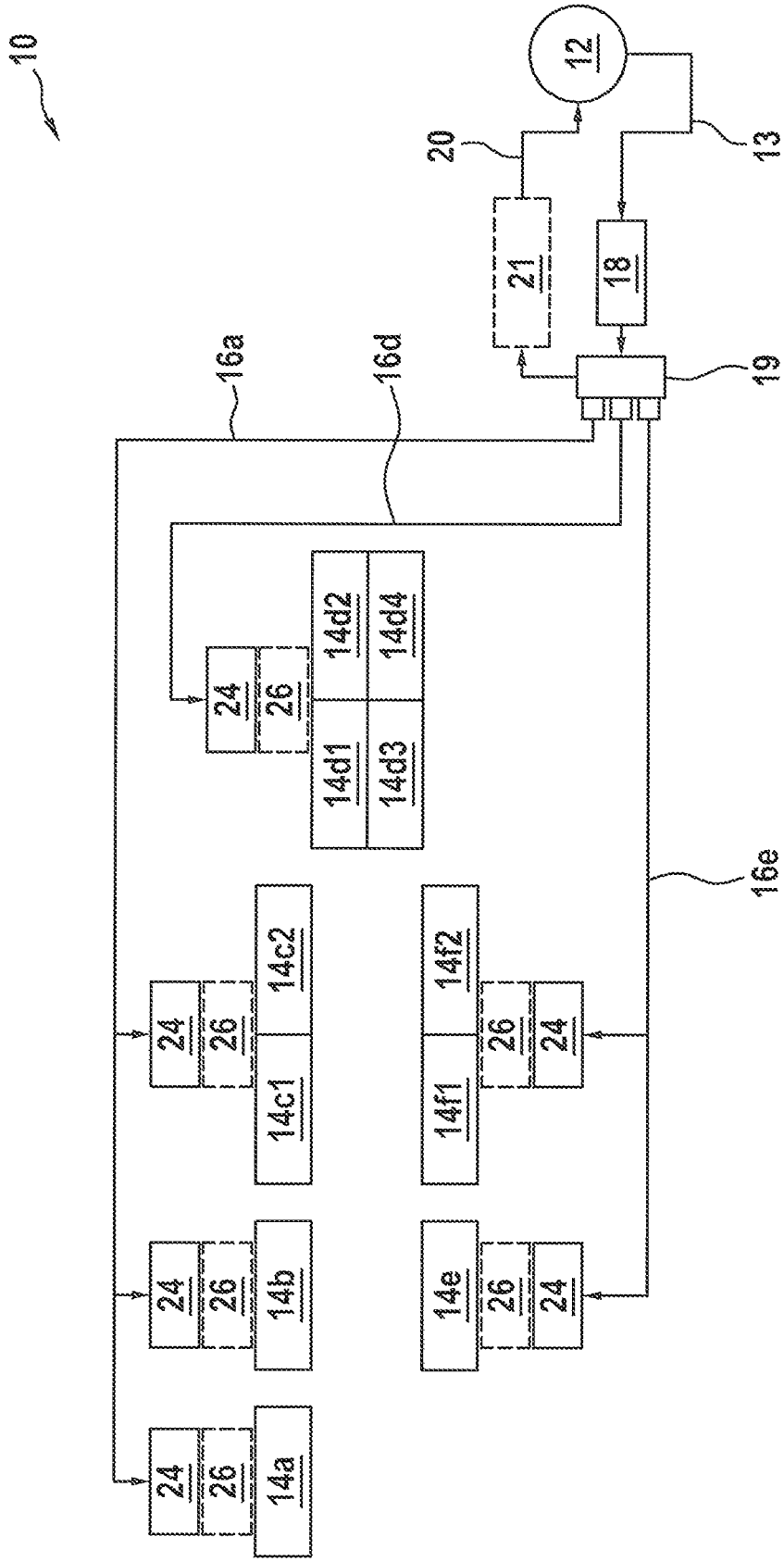
FIG. 2 is a similar diagram of a second exemplary embodiment of a water supply system according to the invention.

FIG. 2 illustrates a second exemplary embodiment of a water supply system for an aircraft. The same components as in the first exemplary embodiment are designated using the same reference signs.

The water supply system 10 depicted in FIG. 2 differs from the first exemplary embodiment, in that not each of the water lines 16n is fed to a single consumer group of water consumers 14n, but that at least one water line (for example 16a and 16e in this case) is fed to multiple consumer groups (in this case three consumer groups of the water consumers 14a/14b/14c1-14c2 and two consumer groups of the water consumers 14e/14f1-14f2, for example). With this concept of water supply to the consumer groups, the buffers 24 of different consumer groups, which are connected to a joint water line 16a, 16e, counterbalance one another and therefore, for example, adapt the water supply to a variable/different use of the respective water consumers 14n in the different consumer groups.

The connection shown in FIG. 2 of multiple consumer groups to joint water lines 16n is of course exemplary and other combinations are naturally also possible. For example, the consumer group with the water consumer 14b can also be combined with the consumer group with the water consumer 14e, rather than with the consumer groups with the water consumers 14a and 14c1-2, and/or the consumer group with the water consumers 14c1-2 can also be combined with the consumer group with the water consumers 14f1-2, rather than with the consumer groups with the water consumers 14a and 14b.

Otherwise, the water supply system 10 depicted in FIG. 2 corresponds to that of the first exemplary embodiment, including the variants indicated above.

Figure 3:
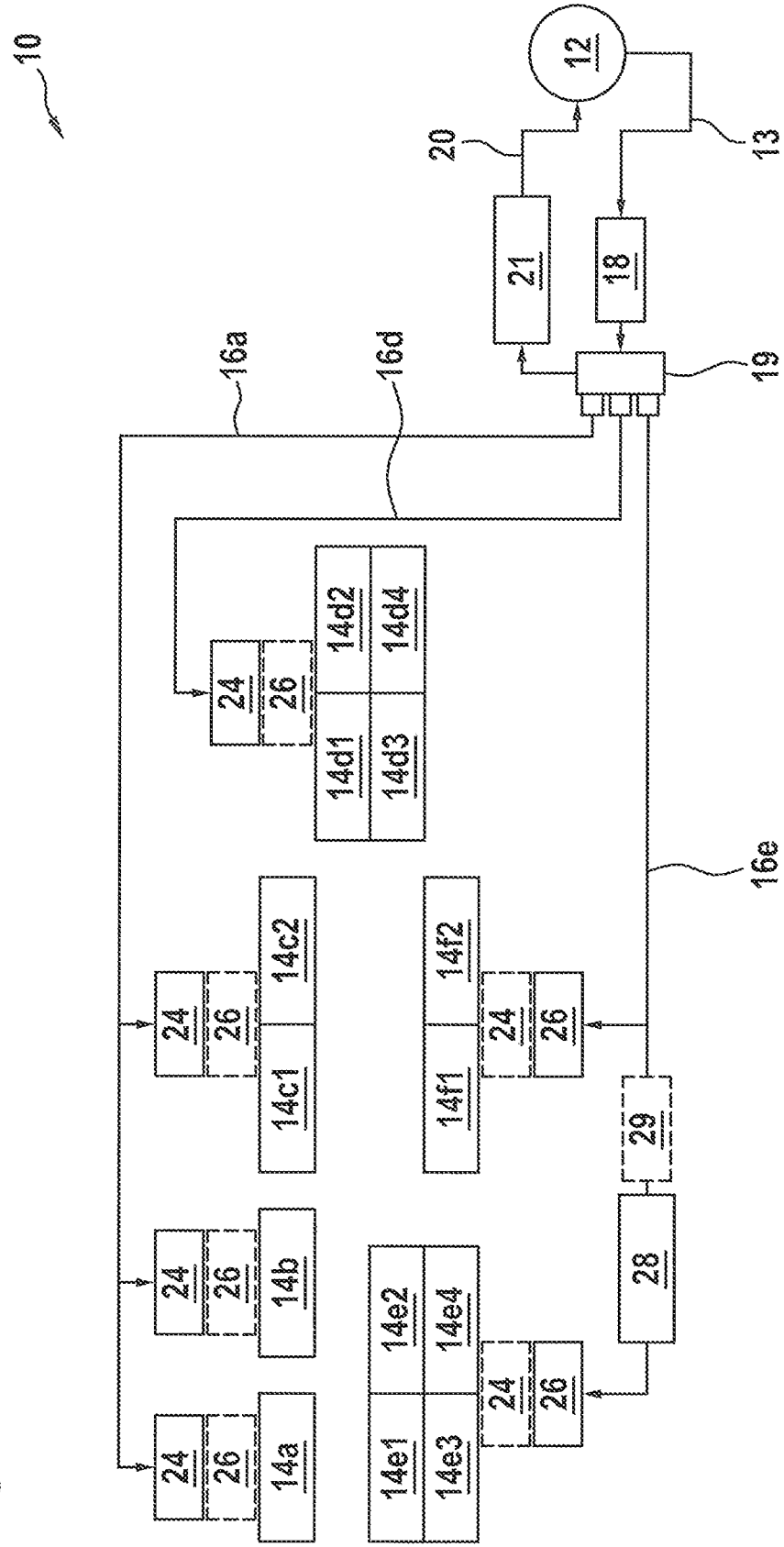
FIG. 3 is a similar diagram of a third exemplary embodiment of a water supply system according to the invention.

FIG. 3 illustrates a third exemplary embodiment of a water supply system for an aircraft. The same components as those in the preceding exemplary embodiments are denoted using the same reference signs.

The water supply system 10 depicted in FIG. 3 differs from the first and second exemplary embodiment, in that a sequential pressure increase for a consumer group is provided in the associated water line.

In this exemplary embodiment, the one consumer group with the four water consumers 14e1-4 has, by way of example, a greater water requirement than the other consumer groups of the water supply system 10. So that this consumer group is nevertheless effectively supplied with water from the water tank 12 via the feed pump 18 and the water line 16e, n booster pump 28 is also contained in the water line 16e fed to this consumer group, said booster pump being connected downstream of the feed pump 18 and therefore supplying more water to this consumer group than to the other consumer groups. As indicated in FIG. 3, an additional buffer 29 may, moreover, be optionally located upstream of this booster pump 28, in order to simplify the operation of said booster pump 28.

Other consumer groups can of course also be supported alternatively or additionally in their respective water lines with a booster pump of this kind.

Otherwise, the water supply system 10 depicted in FIG. 3 corresponds to that in the second exemplary embodiment. The additional use of the booster pump in the third exemplary embodiment may, however, of course also be carried out in the first exemplary embodiment.

FIG. 4 depicts a fourth exemplary embodiment of a water supply system for an aircraft. The same components as in the previous exemplary embodiments are denoted using the same reference signs.

The water supply system 10 depicted in FIG. 4 differs from the first exemplary embodiment, in that the water lines 16n in the water supply system 10 can be vented. The venting may be carried out by bleeder valves on the buffers 24, for example, or by the water consumers 14n (e.g. open water cock in a lavatory).

In order to be able to perform this venting of the water lines 16n, said water lines 16n are connected via the header 19 not only to the discharge line 13 from the water tank 12, but in addition to a drainage line 30 to a drainage water outlet 33. As shown in FIG. 4, this drainage line 30 preferably also uses the feed pump 18 contained in the discharge line 13 from the water tank 12. With this duplicate use of the feed pump 18, a water supply valve 31a is also provided in the discharge line 13 from the water tank 12 upstream of the feed pump 18 and a water supply valve 31b is provided downstream of the feed pump 18 and in the drainage line 30 from the water lines 16n, a drainage valve 32a is provided upstream of the feed pump 18 and a drainage valve 32b is provided downstream of the feed pump 18. With the water supply in operating mode, the water supply valves 31a and 31b are open in the discharge line 13 and the drainage valves 32a and 32b are closed in the drainage line 30; and when the water drainage is in operating mode, the water supply valves 31a and 31b in the discharge line 13 are closed and the drainage valves 32a and 32b in the drainage line 30 are open through venting.

While in this exemplary embodiment all water lines 16n are connected via the header 19 to the one drainage line 30, multiple drainage lines could also be provided as an alternative for different water lines and/or only some of the water lines could be connected to the drainage line.

Otherwise, the water supply system 10 depicted in FIG. 4 corresponds to the one in the first exemplary embodiment. Of course, this embodiment with the drainage line can, however, also be integrated in the other exemplary embodiments.

The subject matter of the invention is defined by the appended claims. The exemplary embodiments explained above only serve to improve understanding of the invention, but they are not intended to limit the scope of protection defined by the claims. As can be seen by the person skilled in the art, other embodiments are also possible within the framework of the invention, in particular by omitting individual features from, or by adding additional features to, the exemplary embodiments described above and through further combinations of features (not specifically mentioned) of two or more of the exemplary embodiments described above.

The following is a summary list of reference numerals and the corresponding structure used in the above description of the invention:

10 water supply system
12 water tank
13 discharge line
14n water consumers
16n water lines
18 feed pump
19 header
20 recirculating line
21 excess pressure valve
24 buffer
26 pressure reducer
28 booster pump
29 additional buffer
30 drainage line
31a,b water supply valves
32a,b drainage valves
33 drainage water outlet

The invention claimed is:

1. A water supply system for an aircraft, the water supply system comprising:
 a water tank;
 one or more water lines, each of said water lines leading to a consumer group with at least one water consumer and, in a water flow direction upstream of said at least one water consumer, at least one buffer for receiving water from the respective said water line, said at least one buffer being configured to have an air pressure of at least 3 bar when empty of water;
 a discharge line for discharging water from said water tank into said one or more water lines;
 said one or more water lines each being a flexible hose made of plastic, having an internal diameter of at least 4 mm and having a length of at most 100 m; and
 a feed pump connected in said discharge line for supplying water from said water tank into said one or more water lines, said feed pump being configured to convey water from said water tank into said one or more water lines at a pressure of at most 25 bar and at a flow rate of at most 1.4 liters per minute.

2. The water supply system according to claim 1, wherein each of said one or more water lines leads to a maximum of four water consumers, the water consumers being lavatories.

3. The water supply system according to claim 1, wherein said consumer group further comprises at least one pressure reducer between said at least one water consumer and said at least one buffer.

4. The water supply system according to claim 1, further comprising a recirculating line disposed to lead from a downstream side of said feed pump back to said water tank and an excess pressure valve connected in said recirculating line, said excess pressure valve being open when a pressure on a downstream side of said feed pump is greater than 25 bar.

5. The water supply system according to claim 1, wherein said one or more water lines is a plurality of water lines each leading to a consumer group with at least one water consumer, and which further comprises a header connecting said discharge line to said plurality of water lines.

6. The water supply system according to claim 1, wherein at least one of said water lines include a common water line leading to at least two consumer groups, each of the consumer groups having at least one water consumer and a buffer, and wherein said buffers that are connected to said common water line are configured to equalize one another.

7. The water supply system according to claim 1, further comprising a booster pump connected downstream of said feed pump in a given water line if a respective said consumer group that is connected to the given water line has an increased water requirement or the given water line is longer than a predetermined length for the water line requiring said booster pump.

8. The water supply system according to claim 1, wherein:
 at least one of said water lines is configured to be vented and is connected to at least one drainage line that leads via said feed pump in said discharge line to a drainage water outlet; and water supply valves provided upstream and downstream of said feed pump in said discharge line from said water tank; and drainage valves provided in said drainage line from said at least one water line upstream and downstream of said feed pump;

said feed pump is enabled to selectively allow water to be conveyed from said water tank into said at least one water line in a water supply operating mode or from said at least one water line to a drainage water outlet in a water drainage operating mode; and wherein said water supply valves are open and said drainage valves are closed in said water supply operating mode, and said water supply valves are closed and said drainage valves are open through venting in said water drainage operating mode.

9. An aircraft, comprising at least one water supply system according to claim 1.

* * * * *